United States Patent [19]
Mrotek

[11] Patent Number: 5,735,672
[45] Date of Patent: Apr. 7, 1998

[54] CENTRIFUGAL COMPRESSOR IMPELLER

[75] Inventor: LeRoy E. Mrotek, South Beloit, Ill.

[73] Assignee: Delaware Capital Formation, Inc., Wilmington, Del.

[21] Appl. No.: 714,559

[22] Filed: Sep. 16, 1996

[51] Int. Cl.$^6$ .................................. F04D 29/34
[52] U.S. Cl. ...................................... 416/213 A
[58] Field of Search ............... 416/213 A; 29/889.7

[56] References Cited

U.S. PATENT DOCUMENTS

| | | | |
|---|---|---|---|
| 3,481,803 | 12/1969 | Hewitt | 416/213 A |
| 3,918,627 | 11/1975 | Kawano et al. | 416/213 A |
| 4,958,987 | 9/1990 | Billingsley | 416/213 A |

FOREIGN PATENT DOCUMENTS

| | | | |
|---|---|---|---|
| 2312671 | 12/1976 | France | 416/213 A |
| 2622823 | 12/1976 | Germany | 416/213 A |
| 64193 | 5/1980 | Japan | 416/213 A |
| 1190093 | 11/1985 | U.S.S.R. | 416/213 A |
| 1028452 | 5/1966 | United Kingdom | 416/213 A |
| 394012 | 6/1993 | United Kingdom | 416/213 A |

*Primary Examiner*—John T. Kwon
*Attorney, Agent, or Firm*—Foley & Lardner

[57] ABSTRACT

A slot welded impeller for a compressor is disclosed having a slotted cover and a hub with a plurality of extending vanes. The cover and hub are oriented such that the vanes are disposed against the opposite side of the cover from the grooves, and the cover is welded to the hub by welding the grooves from the groove side of the cover to the vanes. A slot may be provided at the base of each groove extending through the cover and in contact with the outermost surfaces of the vanes to provide a better weld. The slot area is slightly smaller than the outer surface of the vanes to provide some overlap between each slot and its corresponding vane.

10 Claims, 6 Drawing Sheets

CENTRIFUGAL COMPRESSOR IMPELLER

FIELD OF THE INVENTION

The present invention relates generally to centrifugal compressors. More particularly, it relates to centrifugal compressors with welded impellers. More particularly, it relates to compressor impellers made of a hub and a slot-welded cover.

BACKGROUND OF THE INVENTION

In the field of centrifugal compressors, the reliability of fabricated impellers is a continuing concern. Impellers for high-speed compressor applications, such as multi-stage centrifugal compressors, are typically "closed", e.g. they are in the form of two circular discs separated by and coupled to radially extending vanes. These vanes typically define spiral passageways between the two discs that form the impeller, such that fluids in the passageways are directed outward toward the outer periphery of the discs as the discs rotate. "Open" impellers have a single disc with vanes extending outward from the surface of the disc. Open impellers typically rely on the stationary casing of the compressor to provide the other flow path defining surface.

Large low-pressure compressors are relatively easy to fabricate, since the flow passageways defined by the discs and the vanes of a closed impeller are large. A welder, either human or robotic, can reach into the passageways to weld each vane to both discs in the proper position. For low flow, low special speed impellers, however, such welding is a much more difficult process. These impellers are typically 15 to 25 inches in diameter, formed of circular discs spaced only 0.125 to 0.50 inches apart, with perhaps 20 vanes joining the discs. This configuration would define fluid passageways of about 0.25 by 3 inches in cross-sectional area. It is difficult to reach into a space this narrow with a welding machine.

To fabricate these impellers, a method called "furnace brazing" is almost universally relied upon. In this method, one disc is provided with several vanes extending upward from the disc's surface. This is typically manufactured either by machining the disc and vanes from a single piece of metal, or by forming the plate and welding individual blades to the disc. A similar disc (typically machined from a single block of metal) is formed to mate with the free ends of the vanes. A brazing material having a melting point below that of the discs and vanes is then placed on the free ends of the vanes and extending along their entire length. Both discs are placed in a furnace. As the discs heat, they reach a temperature at which the brazing material melts. At this point the discs are forced together, with the vanes disposed between such that the free ends of the vanes touch the second plate and the excess brazing material is forced out from between the two. This excess brazing material forms a ridge of flashing inside the fluid passageways of the impeller. At this point, the plates are allowed to gradually cool in the furnace, as the brazing material solidifies and bonds the vanes to the second disc.

This process and the impellers formed by this process have many problems. The furnace brazing process affects the heat treating of the impeller parts. They cannot be subsequently heat treated since the brazing material joining the impeller would melt. The impellers are left with residual internal stresses due to their expansion, braze solidification, and subsequent uneven contraction. The flashing left over from the brazing cannot be easily removed, if it can be removed at all. It disrupts the aerodynamic characteristics of the impeller, and can cause damage to the compressor if it breaks off at high speed. The brazing is often incomplete, leaving tiny gaps in the brazed joints that attract contaminants and corrosion, and form stress risers that can cause the impeller to fracture in use. The strength of the brazed joints is much less than the strength of the material it joins, and thus it fatigues and fractures more often. The brazed joints are right angle joints, with no weld fillet or radius to reduce stress concentrations.

There is a need, therefore, for an improved impeller construction method that preserves the impeller's heat treating. There is also a need for an improved impeller construction method that does not leave flashing. There is also a need for an improved impeller that has superior joint strength and is not as prone to fatigue. There is a need for a higher quality full penetration attachment of the hub and blade.

SUMMARY OF THE PRESENT INVENTION

The present invention provides a novel impeller, impeller construction method, and compressor that provides for the above needs.

Thus in accordance with the current invention, an impeller is provided including a hub having a plurality of vanes and a cover having a plurality of slot weldments, where the weldments are fused to the plurality of vanes.

In accordance with a second embodiment of the invention an improved method of manufacturing an impeller is provided including the steps of fabricating a cover having a plurality of grooves fabricating an impeller hub having a plurality of vanes and slot welding the grooves of the cover to the vanes.

In accordance with a third embodiment of the invention, a method of compressing a gas is provided, including the steps of slot welding an impeller cover to an impeller hub to form a plurality of fluid passageways therebetween, and rotating the welded cover and hub about their central axis.

Other principal features and advantages of the invention will become apparent to those skilled in the art upon review of the following drawings, the detailed description and the appended claims.

Figure 1:
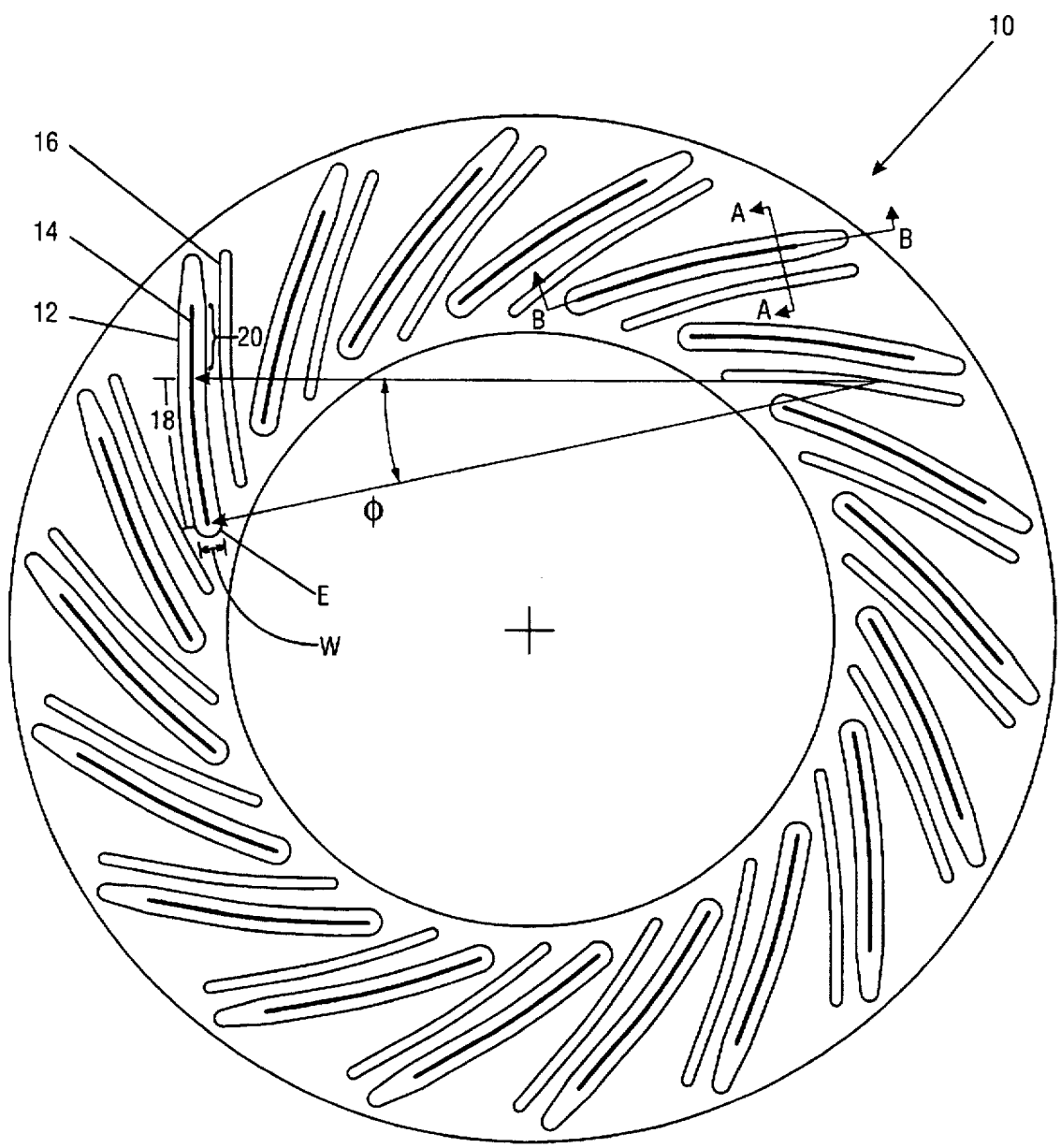
FIG. 1 is a plan view of a first embodiment of an impeller cover.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Turning now to the drawings, FIG. 1 discloses a plan view of an impeller cover 10 having eighteen grooves 12 with slots 14 at the bottom of the grooves spirally extending from the center of the cover toward the periphery of the cover. Adjacent to each slot is a guide 16 (here in the form of a groove).

Cover 10 is in the form of an annulus, having an inner diameter of between 7 and 20 inches and an outer diameter of between 14 and 40 inches, with a thickness of between 0.75 and 1.25 inches. The cover material is preferably a mild or stainless steel, depending upon the application. For impellers, steels such as AISI types 4130–4140, and AISI type 4330 are particularly suitable materials. Precipitation hardening stainless steels such as types 17Cr-4Ni, 15Cr-5Ni, 13Cr-4Ni, 410 and 410NiMo, and 625 Plus alloy are also suitable.

Over the annular portion of the cover that includes grooves 12, cover 10 preferably has a constant thickness varying by no more than 25% thereby providing grooves of a constant depth.

Grooves 12 preferably define an arc 18 that preferably begins at the end of the groove closest to the center of cover 10. As shown here, this arc, indicated by angle phi, is between 5 and 25 degrees, and more preferably is between 10 and 15 degrees. Grooves 12 may also have a tail portion 20 that is substantially straight. Although only a single groove is indicated as having an arc and a straight tail portion, each of grooves 12 preferably has the same configuration. The grooves preferably have a constant top width W over at least the length of the groove over which slot 14 exists at the bottom. By providing a constant groove depth, the heat penetration into the cover and the underlying vane during welding (described below) is relatively constant and thus an even weld is formed. Once the impeller is welded, the upper surface of cover 10 can then be machined to a final thickness that may or may not be constant. Grooves 12 have a radius end E at the end of the groove nearest to the center of cover 10. This radius is preferably between one-half and one-quarter of the width W of the slot.

Guide 16 is provided to allow either laser or friction position sensing for a robotic welder. As the groove is welded, a laser or friction sensor that senses guide 16 and is coupled to the robotic welding head provides feedback to the robotic welder, guiding the welding head consistently along the path of groove 12. In this embodiment it is a recess spaced a predetermined distance from groove 12. One skilled in the art of robotic welding would realize that a variety of other configurations of guide 16 are possible.

Figure 2:
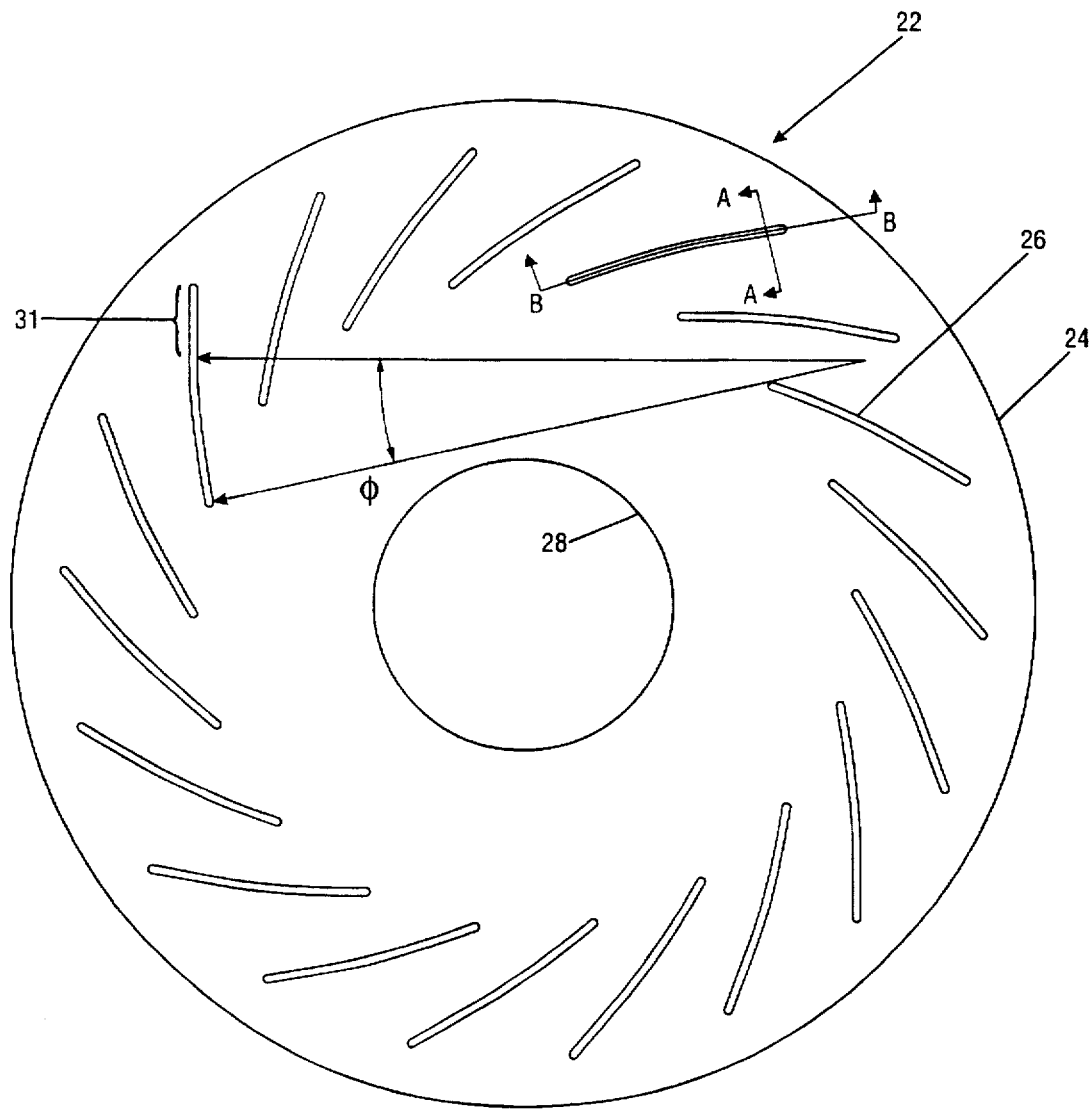
FIG. 2 is a plan view of a first embodiment of an impeller hub.
Figure 3:
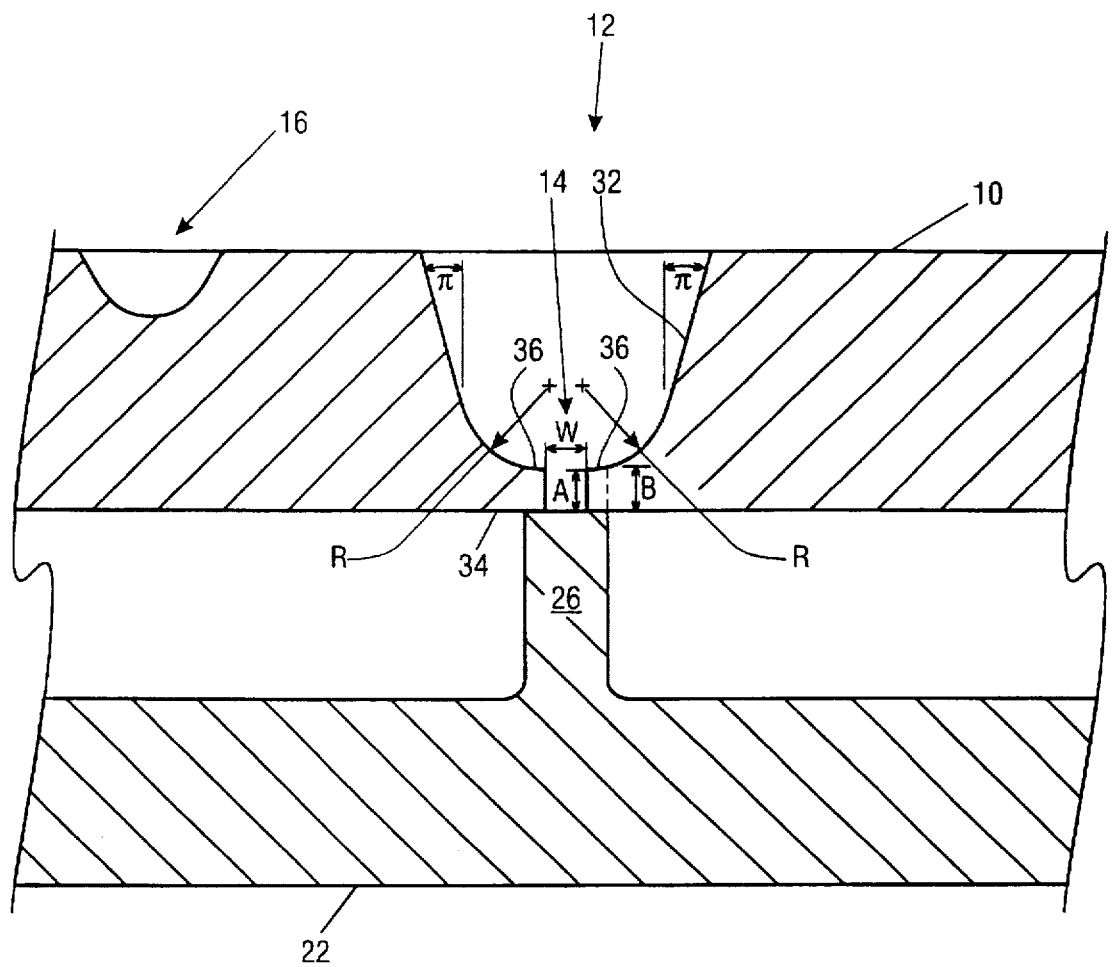
FIG. 3 is cross-sectional view of a groove in the impeller cover of FIG. 1, Section A—A.

FIG. 2 illustrates a plan view of impeller hub 22, including a plate portion 24 from which 18 vanes 26 extend upwardly, and a central hub portion 28. Vanes 26 are arranged on plate portion 24 such that their topmost surfaces 30 contact and cover the underside of slots 14 (FIG. 1) when cover 10 (FIG. 1) is placed over hub 22. Vanes 26 are preferably configured as a spiral extending outwardly from hub portion 28 toward the periphery of impeller hub 22. Vanes 26 preferably define an arc that preferably begins at the end of the vane closest to the center of impeller hub 22. As shown here, this arc, indicated by angle phi, is between 5 and 25 degrees, and more preferably is between 10 and 15 degrees. Vanes 26 may also have a tail portion 31 that is substantially straight. Although only a single vane is indicated as having an arc and a straight tail portion, each of vanes 26 preferably has the same configuration. To assemble cover 10 and impeller hub 22, cover 10 is placed over, and in contact with impeller hub 22 such that the grooves and vanes are aligned by dowel pins passing through the radial pilot holes (not shown) in cover 10 and impeller hub 22 to maintain them in circumferential alignment. FIG. 3 illustrates, in cross-section, this alignment of a single groove/vane combination. Since the vanes and grooves are spaced equidistantly, a similar relation holds true for the other grooves and vanes in the cover/hub assembly. The cross section is taken to illustrate Sections A—A in both FIG. 1 and FIG. 2 when the impeller hub and the cover are placed in contact and prepared for welding. As shown here, the walls of groove 12 preferably have a double "J" profile, wherein each of upper walls 32 of groove 12 preferably diverge from the vertical at an angle phi of between 5 and 25 degrees. More preferably, and as illustrated here, the angle of divergence is 15 degrees. The bottom surface 34 of cover 10 is spaced no more than 0.005 inches away from the top surface of vane 26, more preferably no more than 0.002 inches away. The lips 36 of slot 14 overlap the outer topmost edges of vane 26 by between 0.010 and 0.060 inches. More preferably, the overlap is between 0.020 and 0.045 inches. Most preferably, the overlap is between 0.025 and 0.040 inches. The root gap 38 of slot 14 is preferably between 0.020 and 0.125 inches. More preferably, it is between 0.030 and 0.090 inches. Most preferably, it is between 0.045 and 0.075 inches. The thickness of cover 10 where it overlaps the outer topmost edges of vane 26 is between 0.020 and 0.125 inches. More preferably, it is between 0.030 and 0.090 inches. Most preferably it is between 0.045 and 0.075 inches. The portion of lips 36 that overlap the outer topmost surface of vane 26 preferably have a substantially constant thickness. As shown here, the difference between thickness A (nearest the root gap) and thickness B (nearest the edge of vane 26) is between 0 and 30% of thickness A.

Radius R at the base of groove 12 joins the upper walls of groove 12 with the lips 36 of slot (or root gap) 14. This radius prevents inclusions and porosity and provides for more even distribution of heat through cover 10 during welding. If the radius is too small, there is a risk of voids or inclusions in the weld. If the radius is too large, groove 12 will be too wide, leading to excess filler material, and the failure to achieve the desired drop-through fillet between the vane and the cover. Radius R is therefore preferably between 0.060 and 0.200 inches. More preferably, it is between 0.90 and 0.150 inches. Most preferably, and as indicated here, it is about 0.125 inches.

Figure 4:
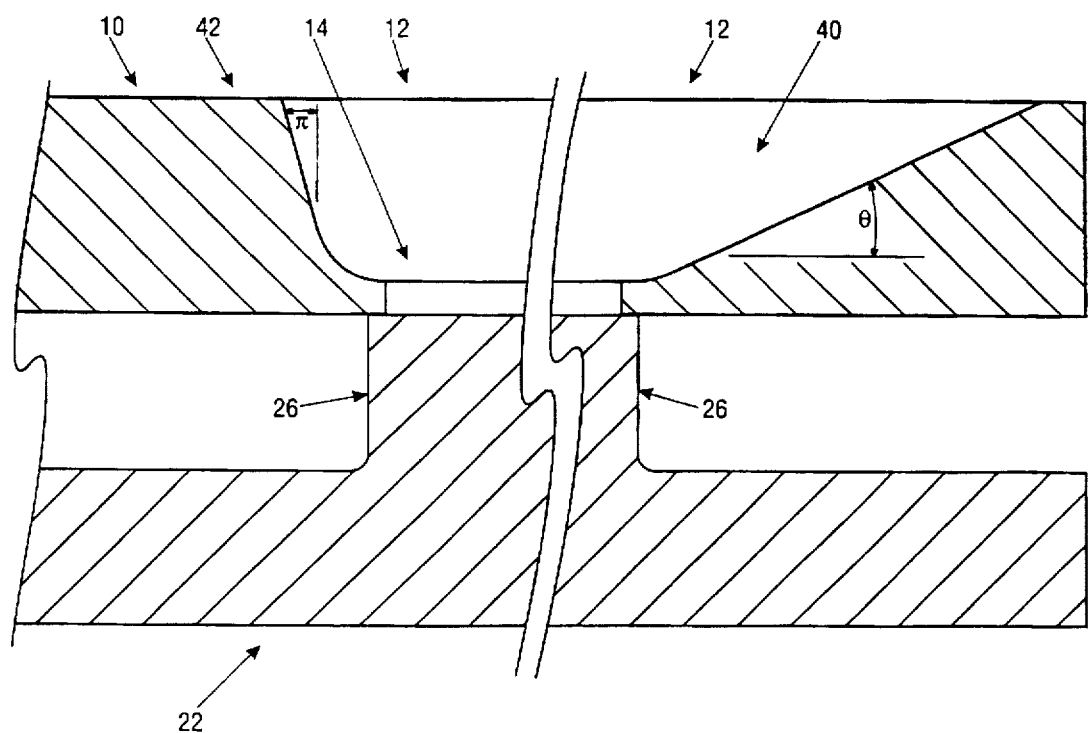
FIG. 4 is a second cross-sectional view of the groove of FIG. 1, Section B—B.

Just as FIG. 3 illustrates the superimposed Sections A—A as shown in FIGS. 1 and 2, when the cover 10 and impeller hub 22 are properly assembled for welding, so FIG. 4 illustrates the superimposed Sections B—B as shown in FIGS. 1 and 2 when the cover and hub are assembled for welding. While FIG. 4 illustrates a single groove/vane combination, the relationship of the other grooves and vanes is the same.

FIG. 4 illustrates a longitudinal cross-section of groove 12 and vane 26, along a parting line that curves and transects slot 14, as shown in FIGS. 1 and 2. As seen here, just as there is a side-to-side overlap between slot 14 and vane 26, there is also an overlap at the ends of slot 14 and vane 26. The amount of overlap, the thickness of the overlap, the angle phi of divergence of the end of groove 12 from the vertical is preferably the same as described in conjunction with FIG. 3. Both ends of groove 12 preferably do not have the same geometry, however. Exit end 40 of groove 12 is configured to provide for gradual withdrawal of the welder from groove 12 at the end of each welding pass. Exit end 40 is therefore provided with a more gradual slope than that of entrance end 42, the end at which each weld pass begins. To minimize distortion and warpage it has been determined that each welding pass should preferably commence at the innermost end of groove 12 and translate down groove 12 until it reaches the outermost end of groove 12. For that reason, exit end 40 is the outermost end of groove 12. Groove 12 should have its exit end 40 tapered at an angle theta of between 10 and 40 degrees of bottom surface 34 of cover 10. More preferred is an angle of between 17 and 32 degrees. Most preferred is an angle of between 20 and 30 degrees. If the angle is too great, the welder will excessively heat the exit end of groove 12 as it is withdrawn, thereby providing an excessively large heat affected zone. In addition, the abrupt exit required by the steep slope will cause the formation of craters and thus increase the chance of crater cracking. If it is too shallow, cover 10 may be overheated, and there is a chance that the weld will blow through the shallow incline into the fluid flow passageways defined between cover 10 and impeller hub 22.

The welding process is carefully controlled to assure the proper penetration of cover 10 and impeller hub 22 and the formation of a consistent bead between the bottom surface 34 of cover 10 and the top of vane 26. Once cover 10 and impeller hub 22 have been properly oriented to provide the alignment shown in FIGS. 3 and 4, they are soaked in a furnace to between 300 and 500 degrees Fahrenheit, and more preferably between 350 and 450 degrees Fahrenheit. This preheat reduces the chance that stress concentrations due to unequal heating and cooling during welding will occur. Once the assembly is preheated, the welding process can begin.

The welding process employed in welding the impeller hub to the cover is called "slot-welding," since a slot (what is called a groove herein) is prepared on the surface of the material opposed to the joint that is to be welded, and that slot is welded. This technique is limited in applicability, however, since creating a complete slot-welded joint between two abutting surfaces is quite difficult. A robotic welder is preferred in the present application, since it is difficult, if not impossible to manually control the travel speed of the welder as it traverses groove 12. The welder is positioned above the inner end of groove 12 and is lowered into position. Welding wire of the same composition as cover 10 and impeller hub 22 is preferably employed. For best results, this wire should have a diameter of between 0.020 and 0.060 inches, and most preferably 0.045 inches.

A first weld pass is made with an arc voltage of 10 volts plus or minus 0.1 volts. The welding power supply should provide a DC output with a negative polarity. The wire feed rate is 37 inches per minute, and the welding head should traverse the length of groove 12 at four inches per minute. A second weld pass is made using the same wire, but at a slower traverse rate (3.5 inches per minute) and a greater wire feed rate (50 inches per minute). As with the first pass, the welding power supply should provide a DC output with a negative polarity. Due to the increased width of groove 12 in the second pass, a magnetic oscillator should be provided to oscillate the weld fluids from side-to-side in groove 12 as the weld proceeds. During the second pass, the voltage across the arc should be controlled at between 9 and 13 volts, and most preferably about 12 volts. Subsequent passes are made at speeds and levels similar to that of the second pass until groove 12 is filled.

Figure 5:
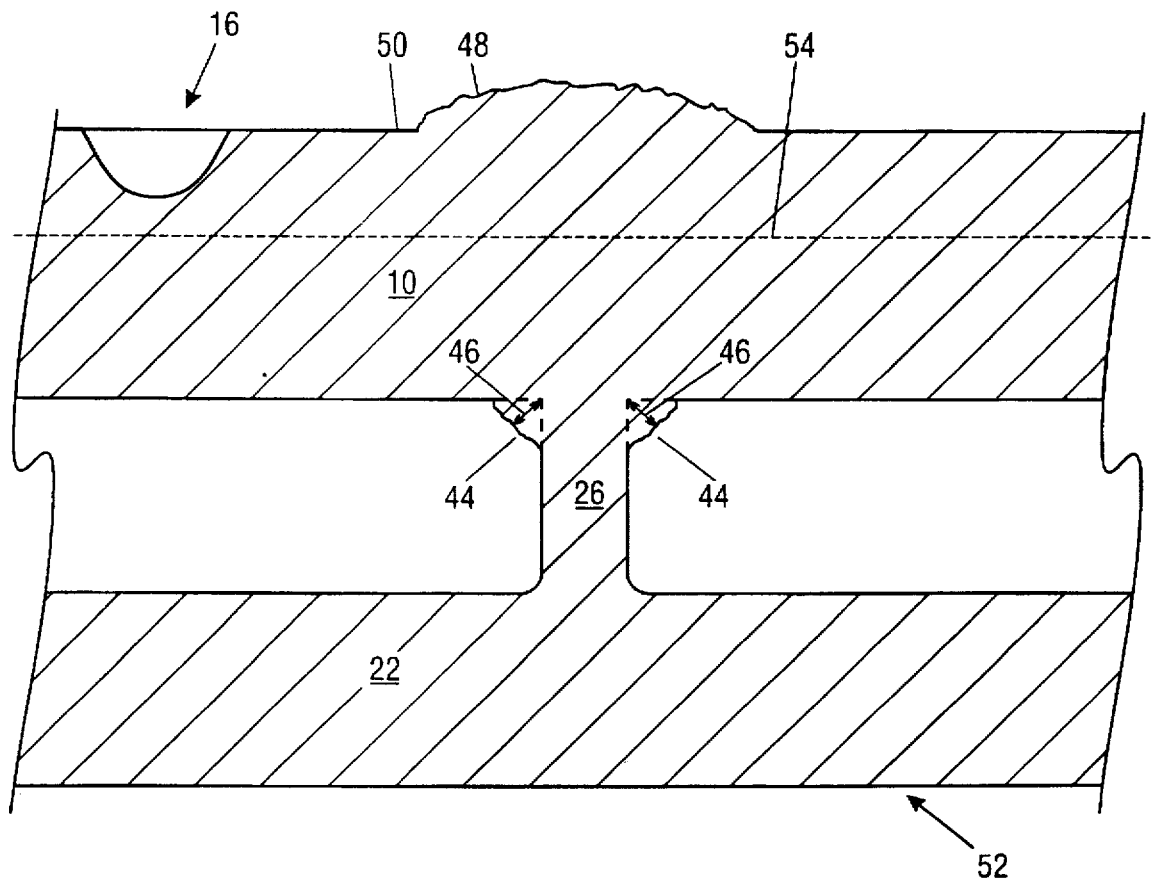
FIG. 5 is a cross-sectional view of the gas cover and hub after slot welding at Section A—A of FIG. 1.

FIG. 5 illustrates the configuration of cover 10, impeller hub 22, and the weldment joining the two. This view is taken through Section A—A, and can therefore be compared with FIG. 3, taken at the same section prior to welding. A fillet 44 is formed along the junction of cover 10 and impeller hub 22 that is even over the entire length of the vane. By the careful control of the welding variables discussed above, the right amount of heat is created to allow the cover base material to flow as a high-viscosity molten metal to form this fillet. To insure complete fusion between the vane and the underside of the cover, the fillet should preferably have a throat 46 of at least the amount of overlap between the vane and the lip of the slot discussed above, and no more than about 0.13 inches. Enough filler material is supplied during welding such that the weldment 48 rises slightly above the upper surface 50 of cover 10 to facilitate final machining.

Once the weldment has cooled and the assembled impeller has reached its final dimensions, the top surface of impeller 52 (formed of cover 10 and impeller hub 22) is machined to provide the necessary close tolerances between the impeller and the compressor casing and to properly balance the impeller. The amount of material to be removed during machining is indicated by dashed line 54 passing through what was cover 10 prior to welding. The distance between upper surface 56 and dashed line 54 (i.e. the amount of material to be removed from the impeller after welding) preferably ranges between 0.37 and 0.75 inches for covers having a final thickness of between 0.13 and 0.75 inches. By removing the top layer of the weldment and the cover to this depth, we eliminate any flaws lying in this layer such as oxide inclusions, cracks or porosities in the weldment, or cracks in the heat affected zone, thereby reducing the chance that flaws will propagate through the impeller under the extreme cyclic stress that the impeller experiences during operation.

Figure 6:
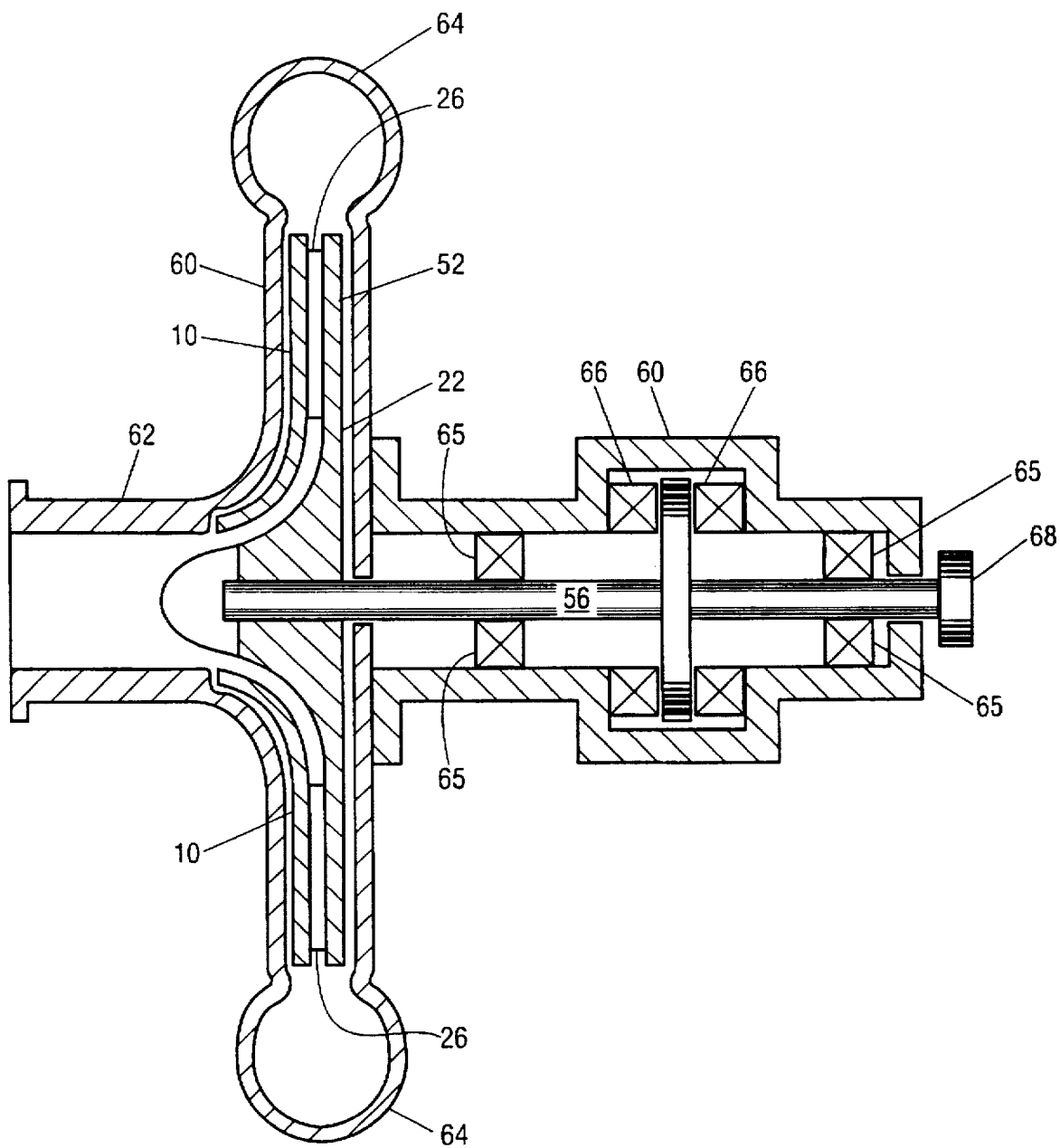
FIG. 6 is a cross-sectional view of a compressor including the impeller of FIG. 5.

Once impeller 52 is manufactured, it can be installed in a compressor, such as that shown in FIG. 6. The impeller 52 includes cover portion 10, vanes 26 and impeller hub 22, and is coupled to rotating shaft 56. Both impeller 52 and shaft 56 are disposed in compressor casing 60, which has an axial inlet tube 62 into which fluid enters the compressor, and an exit scroll 64 from which fluid exits. Shaft 56 is supported by journal bearings 65 and thrust bearings 66. A motor (not shown) is typically coupled to the end 68 of shaft 56 that is disposed outside compressor casing 60 to rotate shaft 56 and impeller 52.

To move fluid through the compressor, impeller 52 is rotated by the motor, causing impeller vanes 26 to pull fluid into the impeller, through the fluid passageways defined between the cover 10 and the impeller hub 22 (FIGS. 4 and 5), and to eject it at the periphery of impeller 52 into scroll 70.

Thus, it should be apparent that there has been provided in accordance with the present invention an improved impeller and impeller construction method that fully satisfies the objectives and advantages set forth above. Although the invention has been described in conjunction with specific embodiments thereof, it is evident that many alternatives, modifications and variations will be apparent to those skilled in the art. For example, although the slots are shown as machined into the impeller cover, they can alternatively be machined in the impeller hub itself. In such a case, the vanes corresponding to these slots would be formed in the cover. All the measurements and parameters described above, including without limitation the measurements of the slots, the vanes, the slot/vane alignment, and the welding parameters would remain the same as described above. Accordingly, it is intended to embrace all such alternatives, modifications and variations that fall within the spirit and broad scope of the appended claims.

The embodiments of the invention in which an exclusive property or privilege is claimed are defined as follows:

1. An impeller for a compressor comprising:

a hub having a plurality of vanes;

a cover having a plurality of slot weldments, wherein the plurality of slot weldments are fused to the plurality of vanes; and a plurality of weld fillets formed between the plurality of vanes and an inner surface of the cover formed simultaneously and integrally with the slot weldments.

2. The impeller of claim 1, wherein the cover and the hub are spaced between 0.125 and 0.5 inches apart.

3. The impeller of claim 1, wherein the cover has an outer diameter of between 14 and 40 inches.

4. The impeller of claim 3, wherein the cover has a thickness of between 0.75 and 1.25 inches.

5. The impeller of claim 4, wherein the thickness varies by no more than 25 percent.

6. A method of manufacturing an impeller, including the steps of:

fabricating a cover having a plurality of grooves;

fabricating an impeller hub having a plurality of vanes;

slot welding the grooves of the cover to the vanes;

forming a plurality of weld fillets between the plurality of vanes and an inner surface of the cover; and forming a plurality of slot weldments in the grooves simultaneously with the step of forming a plurality of weld fillets.

7. An impeller comprising:

a first annular disk having an inner and an outer surface and an axis of rotation;

a plurality of vanes having a proximal end coupled to the first annular disk and a distal end extending therefrom;

a second annular disk coaxial with the first annular disk and having an inner and an outer surface and a plurality of slot weldments formed in the outer surface of the second disk; and a plurality of weld fillets extending between and coupled to the inner surface of the second annular disk and the distal end of the plurality of vanes, wherein each of the plurality of weld fillets is formed simultaneously and integrally with a corresponding one of the plurality of slot weldments by applying heat to the outer surface of the second annular disk.

8. The impeller of claim 7, wherein the first and second annular disks are spaced between 0.125 and 0.5 inches apart.

9. The impeller of claim 7, wherein the first annular disk has an outer diameter of between 14 and 40 inches.

10. The impeller of claim 7 wherein each of the plurality of fillets is substantially even over the length of its associated vane.

* * * * *